United States Patent
Matsushita (10) Patent No.: US 10,217,196 B2
(45) Date of Patent: Feb. 26, 2019

(54) IMAGE PROCESSING APPARATUS HAVING IMAGE REFOCUSING FUNCTION, CONTROL METHOD FOR IMAGE PROCESSING APPARATUS, AND STORAGE MEDIUM

(71) Applicant: CANON KABUSHIKI KAISHA, Tokyo (JP)

(72) Inventor: Takahiro Matsushita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/504,713

(22) PCT Filed: Aug. 19, 2015

(86) PCT No.: PCT/JP2015/073921
§ 371 (c)(1),
(2) Date: Feb. 17, 2017

(87) PCT Pub. No.: WO2016/031837
PCT Pub. Date: Mar. 3, 2016

(65) Prior Publication Data
US 2017/0270645 A1   Sep. 21, 2017

(30) Foreign Application Priority Data
Aug. 26, 2014  (JP) ................ 2014-171941

(51) Int. Cl.
*G06T 5/00* (2006.01)
*H04N 5/77* (2006.01)
(Continued)

(52) U.S. Cl.
CPC ............. *G06T 5/003* (2013.01); *G06T 5/50* (2013.01); *H04N 5/23206* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2008/0080739 A1* | 4/2008 | Muramatsu | G03B 35/18 382/103 |
| 2010/0188522 A1 | 7/2010 | Ohnishi et al. | |

(Continued)

FOREIGN PATENT DOCUMENTS

| | | |
|---|---|---|
| JP | 2010-191883 A | 9/2010 |
| JP | 2014-014071 A | 1/2014 |
| WO | 2012/169140 A1 | 9/2012 |

OTHER PUBLICATIONS

Ren NG, et al., "Light Field Photography with a Hand-Held Plenoptic Camera" Stanford Tech Report CTSR Feb. 2005 (11 Pages).

(Continued)

*Primary Examiner* — Alex Kok S Liew
(74) *Attorney, Agent, or Firm* — Cowan, Liebowitz & Latman, P.C.

(57) ABSTRACT

An image processing apparatus which is capable of carrying out a refocusing process for an image. A plurality of pieces of unprocessed data on which developing process has not been carried out are obtained. A developing process is carried out on the piece of unprocessed data to obtain a piece of processed data, and a subject recognition process is carried out on the processed data to identify a main subject from among a plurality of subjects included in the processed data. And based on a phase difference between the plurality of pieces of unprocessed data, results of the developing process on the plurality of pieces of unprocessed data are synthesized together so that the main subject can be brought into focus.

9 Claims, 9 Drawing Sheets

(51) Int. Cl.
    *H04N 9/804*    (2006.01)
    *H04N 5/232*    (2006.01)
    *G06T 5/50*     (2006.01)
(52) U.S. Cl.
    CPC ........... *H04N 5/23229* (2013.01); *H04N 5/77* (2013.01); *H04N 9/8042* (2013.01); *G06T 2207/20221* (2013.01)

(56) References Cited

U.S. PATENT DOCUMENTS

| | | |
|---|---|---|
| 2010/0194921 A1 | 8/2010 | Yoshioka et al. |
| 2010/0220208 A1* | 9/2010 | Park .................. G03B 13/36 348/222.1 |
| 2013/0329068 A1 | 12/2013 | Hamanaka et al. |

OTHER PUBLICATIONS

The above US Publications were cited in the International Search Report dated Nov. 24, 2015 in International Application No. PCT/PCT2015/073921.

The above foreign patent documents were cited in the Nov. 6, 2018 Japanese Office Action, a copy of which is enclosed without an English Translation, that issued in Japanese Patent Application No. 2014171941.

* cited by examiner

| REFERENCE DATA NAME | DATE AND TIME OF REFERENCE DATA UPDATING | IMAGE DATA NAMES | DATE AND TIME OF SHOOTING | FEATURE QUANTITY |
|---|---|---|---|---|
| taro.kao | 2013.05.23 16:33:00 | face001.jpg | 2013.05.23 15:00:02 | xxxxxxxxxx |
| | | face002.jpg | 2013.04.21 10:32:56 | xxxxxxxxxx |
| | | face003.jpg | 2013.05.23 12:54:09 | xxxxxxxxxx |
| | | : | : | : |
| hanako.kao | 2013.03.03 21:01:09 | face001.jpg | 2013.03.15 20:21:48 | xxxxxxxxxx |
| | | : | : | xxxxxxxxxx |

IMAGE PROCESSING APPARATUS HAVING IMAGE REFOCUSING FUNCTION, CONTROL METHOD FOR IMAGE PROCESSING APPARATUS, AND STORAGE MEDIUM

CROSS-REFERENCE TO RELATED APPLICATIONS

This application is a national phase of International Application No. PCT/JP2015/073921 filed on Aug. 19, 2015, the entire disclosure of which is hereby incorporated by reference.

TECHNICAL FIELD

The present invention relates to an image processing apparatus, a control method for the image processing apparatus, and a storage medium.

BACKGROUND ART

In recent years, there has been an image pickup apparatus in which a microlens array comprised of micro lenses formed in a grid pattern is disposed between a taking lens and an image pickup device, and information on the intensity distribution and incidence directions of light passing through the micro lenses is obtained as pixel signals when a still image and a moving image are taken (see NPL (Non Patent Literature) 1). The image pickup apparatus described in NPL 1 obtains pixel signals based on light having passed through the micro lenses, and generates image data based on the pixel signals. The obtained pixel signals and the generated image data are stored in, for example, the image pickup apparatus. The image pickup apparatus described in NPL 1 also has a refocusing function of changing a focal position of generated image data to an arbitrary position based on the stored pixel signals.

CITATION LIST

Non Patent Literature

{NTL 1} Ren Ng et al., Light Field Photography with a Hand-Held Plenoptic Camera, Standard Tech Report CTSR 2005-02.

SUMMARY OF INVENTION

Technical Problem

In the image pickup apparatus described in NPL 1, however, it is necessary to perform refocusing after a user determines a changed focal position, and the greater the amount of image data that requires refocusing, the greater the time and effort required for the user to perform refocusing.

The present invention provides an image processing apparatus and a control method for the image processing apparatus, which are capable of carrying out a refocusing process for an image without any instruction from a user, as well as a storage medium.

Solution to Problem

Accordingly, the present invention provides an image processing apparatus comprising an obtaining unit configured to obtain a plurality of pieces of unprocessed data on which no developing process has been carried out and processed data on which a developing process has been carried out, an identifying unit configured to carry out a subject recognition process on the processed data to identify a main subject from among a plurality of subjects included in the processed data, a developing process unit configured to carry out a developing process on the plurality of pieces of unprocessed data, and a generation unit configured to, based on a phase difference between the plurality of pieces of unprocessed data, synthesize results of the developing process on the plurality of pieces of unprocessed data so that the main subject can be brought into focus.

Advantageous Effects of Invention

According to the present invention, a subject recognition process is carried out to automatically identify a main subject from among a plurality of subjects, and a refocusing process is carried out so as to focus on the main subject. As a result, a refocusing process for an image is allowed to be carried out without any instruction from a user.

Further features of the present invention will become more apparent from the following description of exemplary embodiments (with reference to the attached drawings).

DESCRIPTION OF EMBODIMENTS

The present invention will now be described in detail with reference to the drawings showing preferred embodiments thereof.

First, a description will be given of a first embodiment of the present invention.

Figure 1:
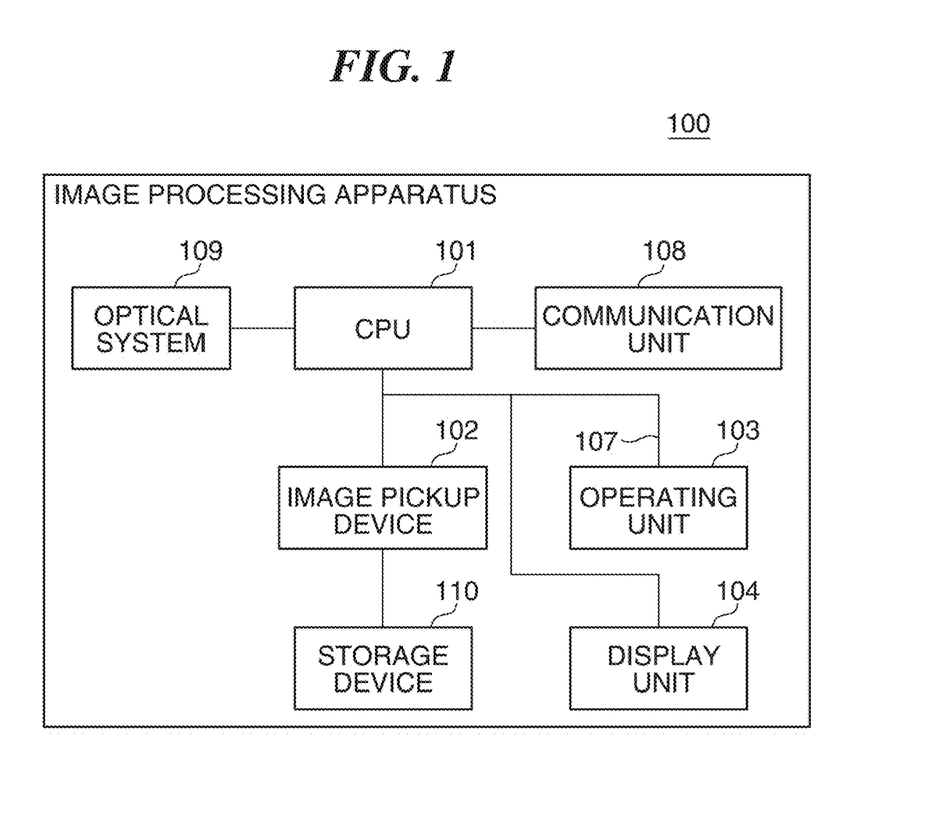
FIG. 1 is a block diagram schematically showing an arrangement of an image processing apparatus according to an embodiment of the present invention.

FIG. 1 is a block diagram schematically showing an arrangement of an image processing apparatus 100 according to the first embodiment of the present invention. The image processing apparatus 100 is implemented by an image pickup apparatus or a communication apparatus such as a digital camera, a digital video camera, a smartphone, or a tablet device, which has an arrangement described below.

The image processing apparatus 100 in FIG. 1 has a CPU 101, an image pickup device 102, an operating unit 103, and a display unit 104, and these component elements are connected to one another via a bus 107. The image processing apparatus 100 also has a communication unit 108, an optical system 109, and a storage device 110, the communication unit 108 and the optical system 109 are connected to the CPU 101, and the storage device 110 is connected to the image pickup device 102.

The CPU 101 is a control device for controlling the component elements of the image processing apparatus 100 and executing programs stored in the storage device 110. In the description of the present embodiment, it is assumed that, for example, a CPU (central processing unit) is used, but the present invention may be implemented in a like manner even when an MPU (micro processing unit) or the like is used instead. The image pickup device 102 converts light having passed through the optical system 109 to pixel signals and generates image data. The operating unit 103 has hardware keys and an operating panel, and a user inputs instructions to the image processing apparatus 100 through the hardware keys and the operating panel. The display unit 104 displays live-view images, picked-up and recorded still images, picked-up and recorded moving images, operating guidance, or the like.

It should be noted that the CPU 101 is started by reading an operating system (OS) and application programs from the storage device 110, to be described later, and in accordance with them, the CPU 101 controls the component elements to perform various functions. For example, the CPU 101 carries out a resizing process such as predetermined pixel interpolation or reduction and a color conversion process on image data. The CPU 101 also carries out an object recognition process (subject recognition process) to detect a subject, for example, a human face from image data. Further, the CPU 101 carries out a refocusing process in which it generates image data with a focus on a detected subject and stores the image data obtained as a result of refocusing in the storage device 110.

The communication unit 108 is connected to and sends and receives control commands and data to and from an external apparatus via, for example, a USB (Universal Serial Bus) cable or a wireless LAN. Control commands and data are sent and received using a protocol such as PTP (Picture Transfer Protocol), MTP (Media Transfer Protocol), or NFC (Near-Field Communication). The optical system 109 has a lens, a shutter, and a diaphragm, and light having passed through the optical system 109 is converted to pixel signals by the image pickup device 102.

The storage device 100 stores various programs, reference data on a subject (hereafter referred to merely as "reference data"), or image data, for example, RAW data 501 and 502 and a proxy image (FIG. 5), to be described later. It should be noted that the RAW data 501 and 502 are obtained by recording data substantially as they are immediately after they are output from the image pickup device 102 and have high resolution and high tone as compared to the proxy image 503. For example, RAW data is obtained by converting data output from an image pickup device into a compressed state through highly-efficient coding using a technique such as wavelet conversion or difference coding. Here, RAW data is lossless compressed data.

A proxy image, which is, for example, image data in a JPEG format, is obtained by not only converting data output from an image pickup device into a compressed state through highly-efficient coding using a technique such as wavelet conversion or difference coding but also subjecting the data further to a developing process and a JPGE compression process and recording the same. In the present embodiment, RAW data and a proxy image are generated based on pixel signals, which are output from an image pickup device, in an image pickup process carried out in response to the same image pickup instruction.

Figure 5:
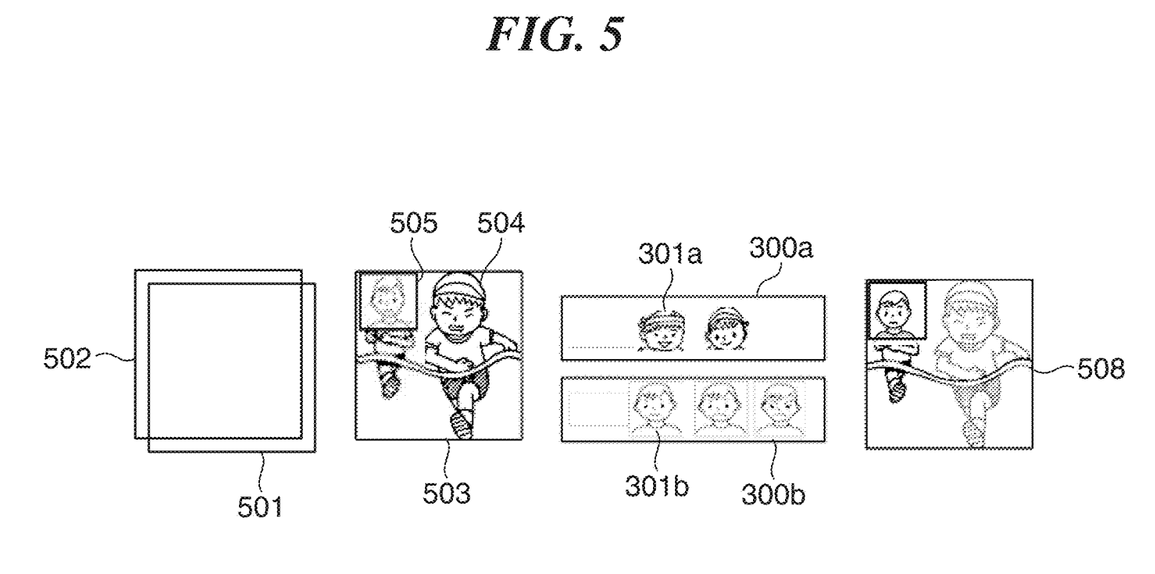
FIG. 5 is a view useful in explaining image data which is subjected to refocusing in the embodiment of the present invention.

It should be noted that a proxy image may be generated by carrying out a developing process on RAW data using a predetermined adjustment value. Namely, RAW data may also be referred to as unprocessed data, and a proxy image may also be referred to as processed data. Thus, RAW data is characterized by little degradation with respect to data obtained from an image pickup device but having a large data size as compared to a proxy image. The RAW data 501 and 502 and the proxy image 503 based on the same pixel signals are stored together in one file or stored in respective files, which are in turn associated with one another.

Figure 2:
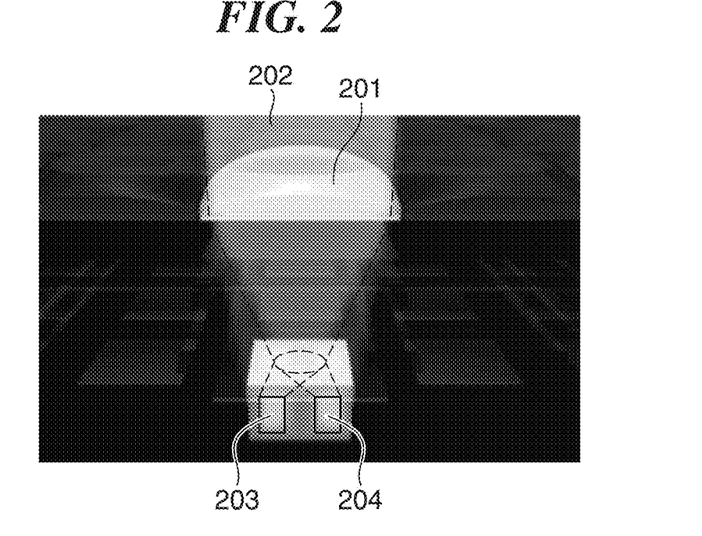
FIG. 2 is a view useful in explaining RAW data generated by an image pickup device of the image processing apparatus according to the embodiment of the present invention.

FIG. 2 is a view useful in explaining RAW data generated by the image pickup device 102 of the image processing apparatus 100 according to the present embodiment.

The image pickup device 102 of the image processing apparatus 100 has a number of photodiodes 203 and 204 (light detectors) of two types which detect light 202 obtained through a microlens 201. One photodiode 203 and one photodiode 204 form a pair (a picture element). In each pair, the photodiode 203 and the photodiode 204 function independently of each other, and each of the photodiodes 203 detects the light 202 to generate the RAW data 501, to be described later, and each of the photodiodes 204 detects the light 202 to generate the RAW data 502, to be described later, It should be noted that in one pair, the photodiodes 203 and 204 detect the same light 202 at different positions, and hence the incident angle of the light 202 incident on the photodiode 203 and the incident angle of the light 202 incident on the photodiode 204 are different. This causes a phase difference between the light 202 detected by the photodiode 203 and the light 202 detected by the photodiode 204, and this results in a phase difference between the RAW data 501 and the RAW data 502 as well.

Figure 3:
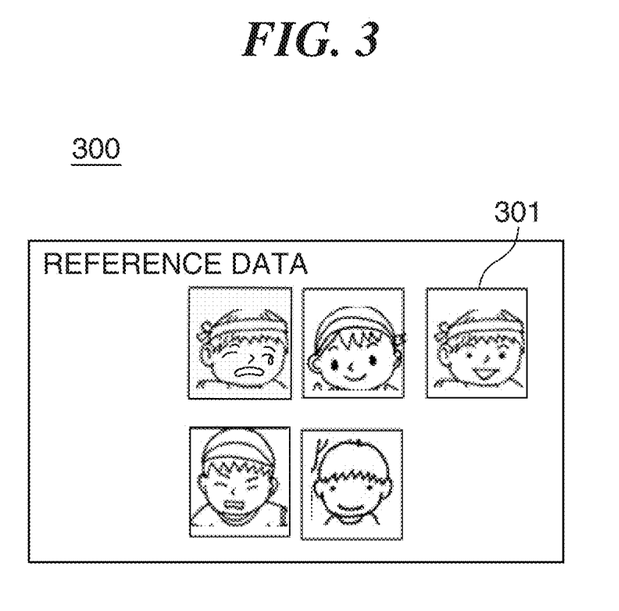
FIG. 3 is a view useful in explaining reference data stored in a storage device of the image processing apparatus according to the embodiment of the present invention.

FIG. 3 is a view useful in explaining reference data 300 stored in the storage device 110 in FIG. 1.

Referring to FIG. 3, the reference data 300 is information on main subjects. The main subjects are detected from the proxy image 503 by carrying out a subject recognition process on the proxy image 503 based on the reference data 300.

As the reference data 300, for example, five pieces of image data on a face of a certain person 301 are recorded as main subjects. These five pieces of image data differ in facial expression of the person 301 and the timing of shooting. According to the present embodiment, in the subject recognition process, each piece of the image data recorded as the reference data 300 is compared with image data on a specific subject (identified subject) included in the proximity image 503. Based on the comparison results, whether or not the identified subject in the proxy image 503 matches the face of the person 301 is determined, and when they match, it is decided that the identified subject in the proxy image 503 is a desired main subject.

It should be noted that the reference data 300 may be comprised of feature quantities 405 (FIG. 4), to be described later, in place of image data. A feature quantity calculated by analyzing the image data on the identified subject in the proxy image 503 and the feature quantities 405 represented by the reference data 300 may be referred to, and whether or not they match each other may be determined.

Figure 4:
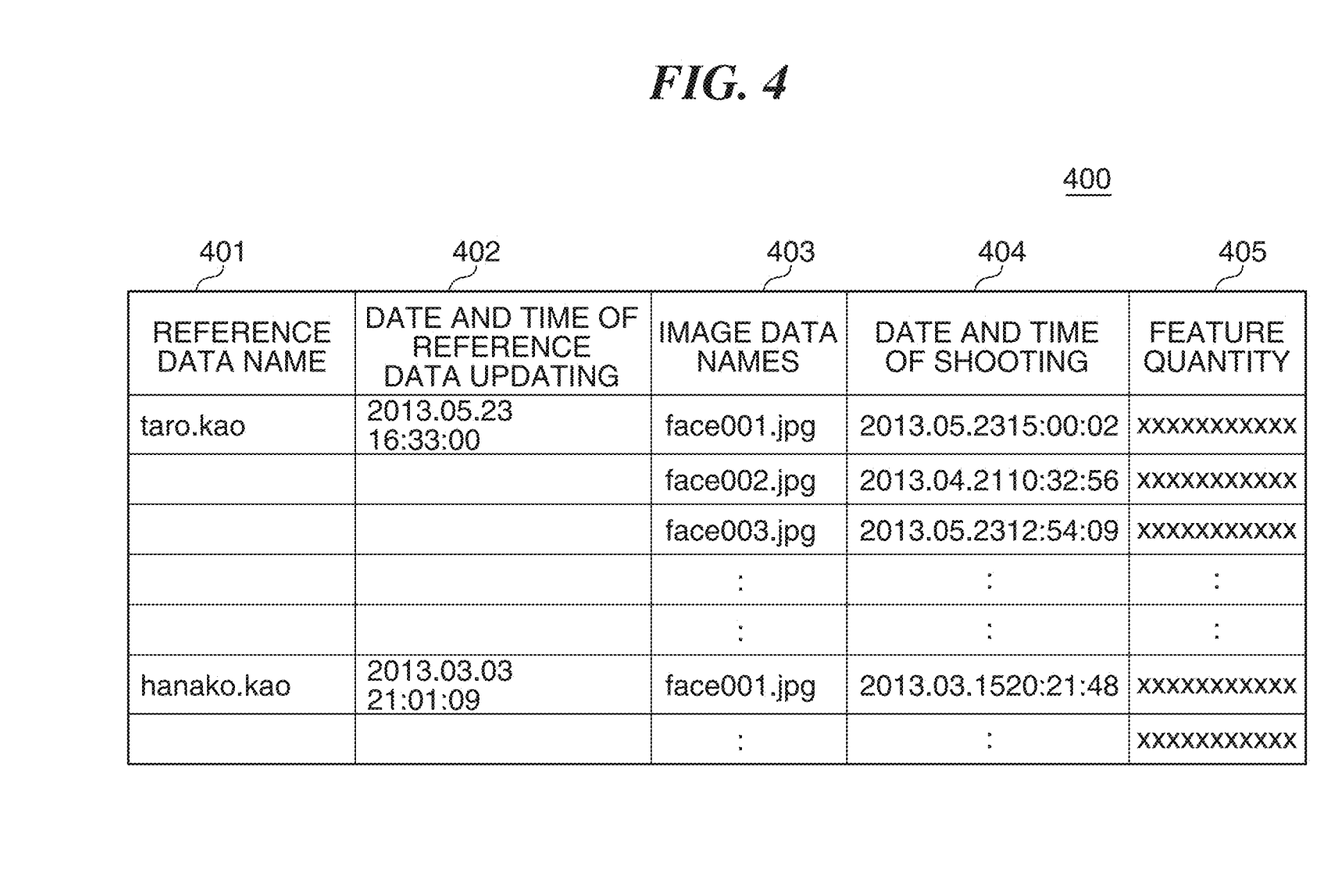
FIG. 4 is a view useful in explaining a reference data management file which manages the reference data in FIG. 3.

The reference data 300 as well as features of the respective five pieces of recorded image data on the face is recorded in a reference data management file 400 in FIG. 4. The reference data management file 400 manages not only the reference data 300 on the certain person 301 but also the reference data 300 on other persons, that is, reference data on faces of a plurality of persons. In the reference data management file 400, reference data names 401 of reference data on respective human faces, dates and times of reference data updating 402, image data names 403, dates and times of shooting 404, and feature quantities 405 on human faces are recorded.

The reference data names 401 are names of respective pieces of reference data. As the dates and times of reference data updating 402, dates and times at which image data recorded as reference data was updated are recorded. The image data names 403 are names of image data recorded as reference data, and the dates and times of shooting 404 are dates and times at which image data recorded as reference data was taken by shooting. As the feature quantities 405, features of respective pieces of image data on five faces recorded as the reference data 300, for example, indexes obtained by converting ages and degrees of delight, anger, sorrow, and pleasure emotions on facial expressions of persons in image data into numeric values.

FIG. 5 is a view useful in explaining a process in which a subject identified based on the reference data 300 in FIG. 3 is refocused.

The image processing apparatus 100 generates the RAW data 501 and 502 in FIG. 5 and generates the proxy image 503 from the RAW data 501. Specifically, the CPU 101 carries out a compression process on the RAW data 501 to generate reduced RAW data. The CPU 101 then subjects the reduced RAW data to a developing process in which it converts the reduced RAW data to a predetermined file format such as JPEG or TIFF, thus generating the proxy image 503.

Here, the developing process is carried out using a predetermined adjustment value. It should be noted that the proxy image 503 should not always be generated from reduced RAW data. For example, RAW data may be generated from pixel signals output from the image pickup device 102, and the same pixel signals may be subjected directly to a compression process and a developing process or the like based on a predetermined adjustment value and further subjected to predetermined file format conversion to generate a proxy image. Alternatively, the same pixel signals as RAW data may be subjected directly to only a compression process to generate and store reduced RAW data in advance, and after that, as the need arises, a developing process may be carried out on the reduced RAW data to generate a proxy image.

The developing process for generating the proxy image 503 includes a process to adjust parameters such as contrast, white balance, color balance, lightness, and saturation. Thus, the proxy image 503 is generated based on data obtained by subjecting the RAW data 501 to a compression process, and the data amount of the proxy image 503 is smaller than that of an image obtained by directly subjecting the RAW data 501 to a developing process. Therefore, the time and load required to display the proxy image 503 on the display unit 104 and carry out a subject recognition process on the proxy image 503 is smaller than in the case where an image obtained by as a result of a developing process is subjected to the same process.

Figure 6:
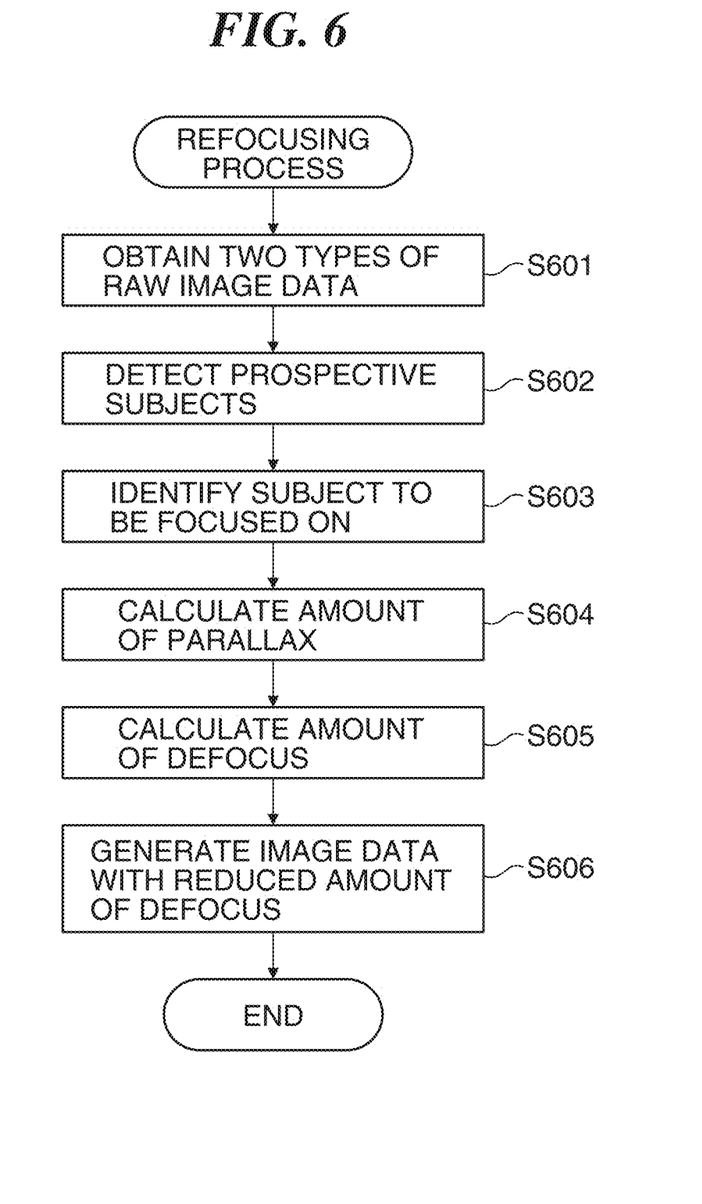
FIG. 6 is a flowchart showing the procedure of a refocusing process which is carried out by the image processing apparatus according to the embodiment of the present invention.

FIG. 6 is a flowchart showing the procedure of a refocusing process which is carried out by the CPU 101 in FIG. 1. The refocusing process in FIG. 6 is based on the premise that in the proxy image 503, the subject 504 in FIG. 5 is focused on, the subject 505 is out of focus, and the subject 505 is an object to be refocused on. By refocusing on the subject 505 in the refocusing process, image data 508 with the subject 505 focused on and the subject 504 out of focus is obtained.

As described above, the photodiodes 203 and 204 detect the light 202 independently of each other to generate the two types of RAW data 501 and 502. And the CPU 101 develops the RAW data 501 (hereafter referred to as "RAW development") to obtain the proxy image 503 (step S601). The CPU 101 automatically detects an identified subject from the proxy image 503 (step S602). Here, the CPU 101 detects the subjects 504 and 505 by carrying out a subject recognition process in which it detects a human face as an identified subject from the proxy image 503. The CPU 101 may detect a plurality of identified subjects (not shown) as well as the subjects 504 and 505.

Further, the CPU 101 refers to reference data stored in the storage device 110. Here, for example, reference data 300a on a person 301a and reference data 300b on a person 301b are referred to as shown in FIG. 5. By referring to the reference data 300b, the CPU 101 identifies the subject 505 corresponding to the person 301b as a main subject from among the plurality of identified subjects detected in the step S602 (step S603). It should be noted that when identifying the subject 505 as a main subject, the CPU 101 may use a G image pickup device, a B image pickup device, an R image pickup device, and so on as well as the proxy image 503.

As described above, the CPU 101 automatically identifies the subject 505 as a main subject using the reference data 300b from among the plurality of identified subjects included in the proxy image 503. As a result, based on the subject 505 detected from the proxy image 503, the CPU 101 performs refocusing on the RAW data. Moreover, the user is saved from having to manually choose the subject 505 that should be focused on, and the time and load required for the user to perform refocusing are reduced. Further, since the subject 505 to be refocused on is identified based on the reference data 300b, a subject unintended by the user is prevented from being focused on.

Then, for the RAW data 501 and 502, the CPU 101 calculates the amount of parallax which is a phase difference between signals detected by the respective photodiodes 203 and 204 for the area of the subject 505 identified in the step S603 (step S604) and performs predetermined computations on the amount of parallax to calculate the amount of defocus (step S605). A method to calculate the amount of defocus is well known due to the publication of the prior art (Japanese Laid-Open Patent Publication (Kokai) No. 2008-15754), and hence description thereof is omitted.

Then, the CPU 101 carries out a developing process on each of the RAW data 501 and 502 to obtain two types of RAW development results and synthesizes these two types of RAW development results so that the area of the subject 505 which is the main subject can be focused on. For example, the CPU 101 synthesizes the two types of RAW development results so that the absolute value of the amount of defocus calculated in the step S605 can be equal to or smaller than a predetermined value, thus generating image data 508 (refocused image) in which the area of the subject 505 is refocused on (step S606), and terminates the present process. If the amount of defocus is not equal to or smaller than the predetermined value, the two types of RAW development results are synthesized so that the amount of defocus can be minimum.

Further, for the subject 504 as well, by carrying out the same refocusing process as that for the subject 505 described above, the CPU 101 can obtain high-quality image data with a focus on the subject 504 from the RAW data 501 and 502 that have not been subjected to a compression process. It should be noted that for all subjects identified using the reference data 300, the CPU 101 may generate image data based on RAW development results. Alternatively, only for subjects in the reference data 300 which satisfy predetermined conditions, the CPU 101 may generate image data based on RAW development results.

According to the process in FIG. 6, since the process to identify the subject 505 designated as an object to be refocused on is carried out using the reference data 300b, the refocusing process for an image is allowed to be carried out without any instruction from the user.

A description will be now given of a second embodiment of the present invention.

The second embodiment of the present invention is basically the same as the first embodiment described above in terms of constructions and operations, differing from the first embodiment in that an image processing apparatus is connected to a server to constitute an image processing system. Features of constructions and operations that are the same as those in the first embodiment will thus not be described, only constructions and operations different from those of the first embodiment being described below.

Due to recent development of the cloud technology, image data taken by a certain person using an image pickup apparatus may be shared with another person using a smartphone. In this case, image data is transferred from the image pickup apparatus to the smartphone by way of a server, but in the image data, a subject which is in focus and a subject which is desired to be brought into focus by the other person may be different. To cope with such a case, a refocusing process is carried out in the present embodiment.

Figure 7:
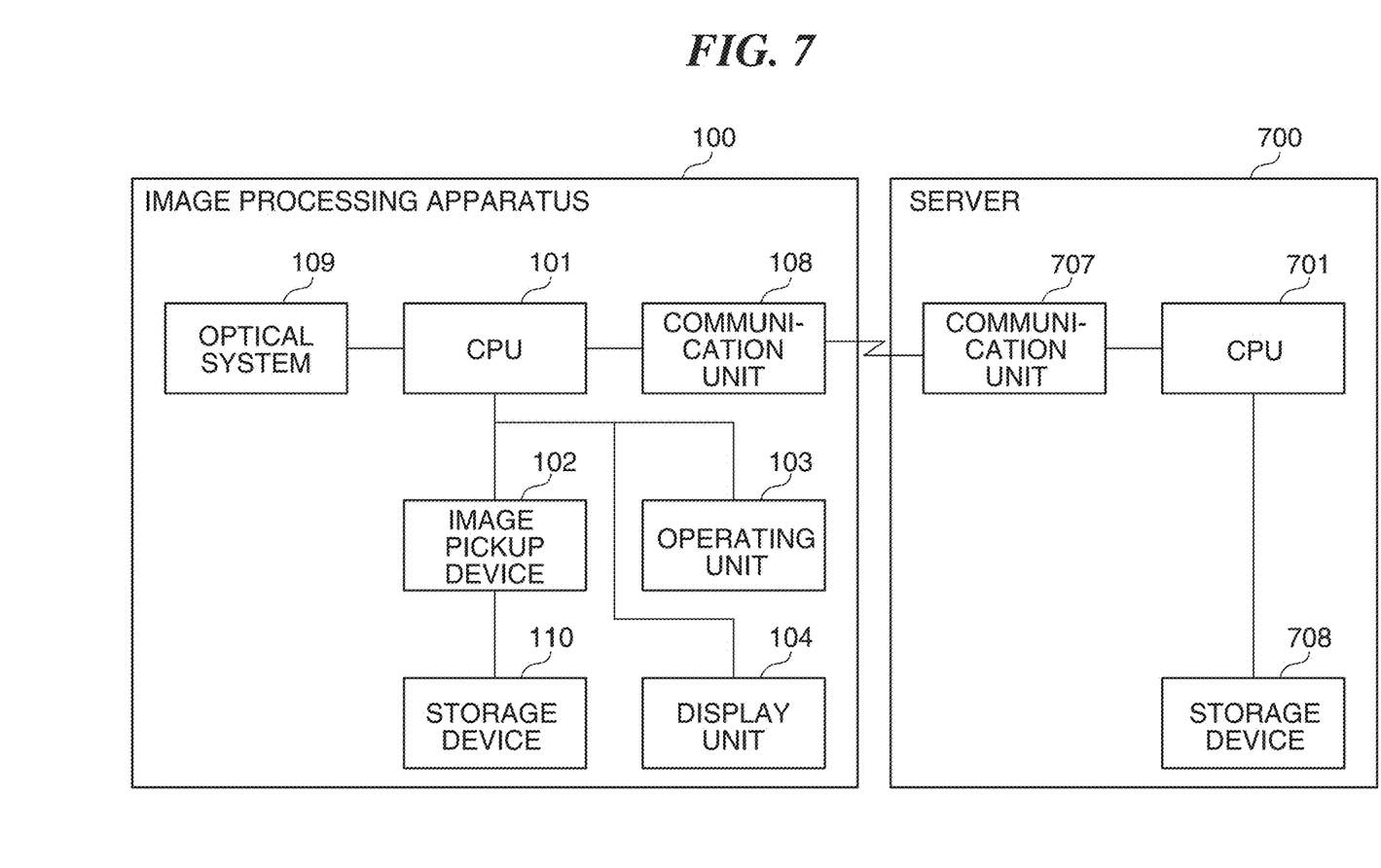
FIG. 7 is a block diagram schematically showing an arrangement of an image processing system in which the image processing apparatus according to the second embodiment of the present invention is connected to a server.

FIG. 7 is a block diagram schematically showing an arrangement of the image processing system in which the image processing apparatus 100 according to the second embodiment of the present invention is connected to the server 700. The present embodiment differs from the first embodiment in that the CPU 101 of the image processing apparatus 100 according to the present embodiment does not detect a subject or perform refocusing.

The server 700 has a CPU 701, a communication unit 707, and a storage device 708, and the communication unit 707 and the storage device 708 are connected to each other via the CPU 701.

The CPU 101 executes programs stored in the storage device 708 and controls the component elements of the server 700 to perform various functions. The communication unit 707 is connected to and sends and receives control commands and data to and from the communication unit 108 of the image processing apparatus 100. Image data and personal information required to share image data with a third party such as an e-mail address are stored in the storage device 708. It should be noted that an entity file of image data to be shared with a third party may be stored in an external storage device, and in this case, a file path to the entity file of the image data is stored in the storage device 708. Image data to be stored in the storage device 708 is obtained by the CPU 701 via the communication unit 707.

Figure 8:
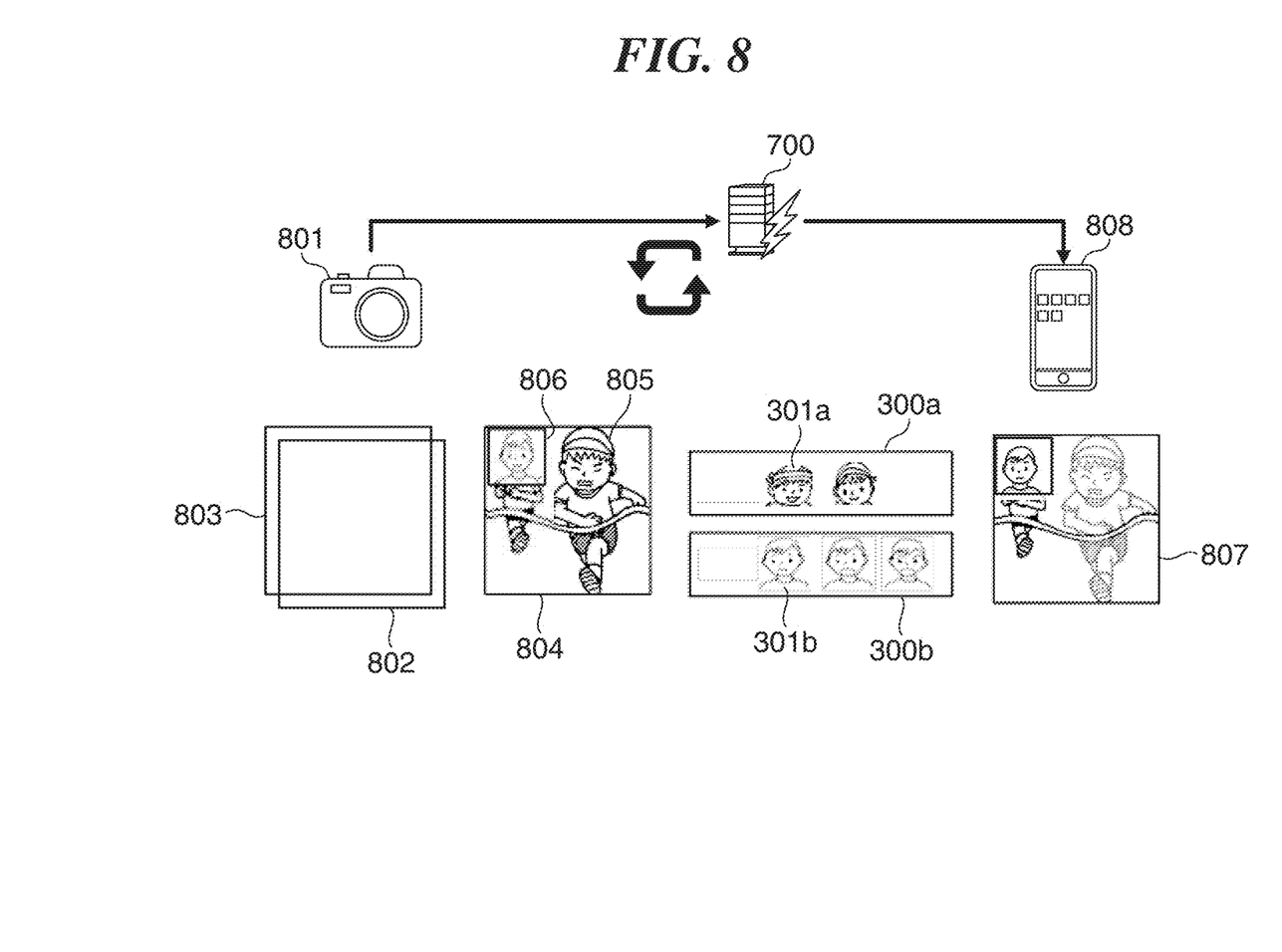
FIG. 8 is a view useful in explaining image data which is subjected to refocusing in the second embodiment of the present invention.

Further, an OS, various programs such as application programs, the reference data 300a and 300b described above, image data, for example, RAW data 802 and 803 and a proxy image 804, to be described later, are stored in the storage device 708. It should be noted that the RAW data 802 and 803 and the proxy image 804 are data and an image of which contents are the same as those of the RAW data 501 and 502 and the proxy image 503 described above.

The CPU 701 carries out a resizing process such as predetermined pixel interpolation or reduction and a color conversion process on image data received via the communication unit 707. The CPU 701 also carries out a subject recognition process to detect a subject, for example, a human face from image data. The CPU 701 then carries out a refocusing process in which it generates image data with a focus on the detected subject and stores the image data obtained by the refocusing process in the storage device 708.

FIG. 8 is a view useful in explaining image data which is subjected to refocusing by the server 700 in FIG. 7.

In FIG. 8, it is assumed that there are a user who performs shooting using an image pickup apparatus 801 (hereafter referred to as "the source user) and a remote user who is away from the source user and uses a smartphone 808 to receive image data obtained as a result of shooting by the image pickup apparatus 801.

First, the image pickup apparatus 801 sends RAW data 802 and 803 and a proxy image 804 to the server 700. At this time, the CPU 701 of the server 700 detects identified subjects from the proxy image 804. Here, a plurality of subjects (not shown) as well as the subjects 805 and 806 are detected as identified subjects from the proxy image 804. The CPU 701 refers to the reference data 300a and 300b stored in the storage device 708 to identify subjects 805 and 806 as main subjects corresponding to the persons 301a and 301b from among a plurality of identified subjects. It should be noted that in the present embodiment, it is assumed that a subject on which the remote user desires to focus on is the subject 806, and the server 700 receives a designation of the subject 806 in advance from a terminal (for example, the smartphone 808) of the remote user and stores the same.

In the present embodiment, the CPU 701 of the server 700 carries out the refocusing process (FIG. 6) described above to obtain image data 807 with a focus on the subject 806. The CPU 701 sends the image data 807 to the smartphone 808 via the communication unit 707. As a result, the remote user obtains the image data 807 with a focus on the subject 806 as he or she desires without requesting the source user to perform refocusing.

Figure 9:
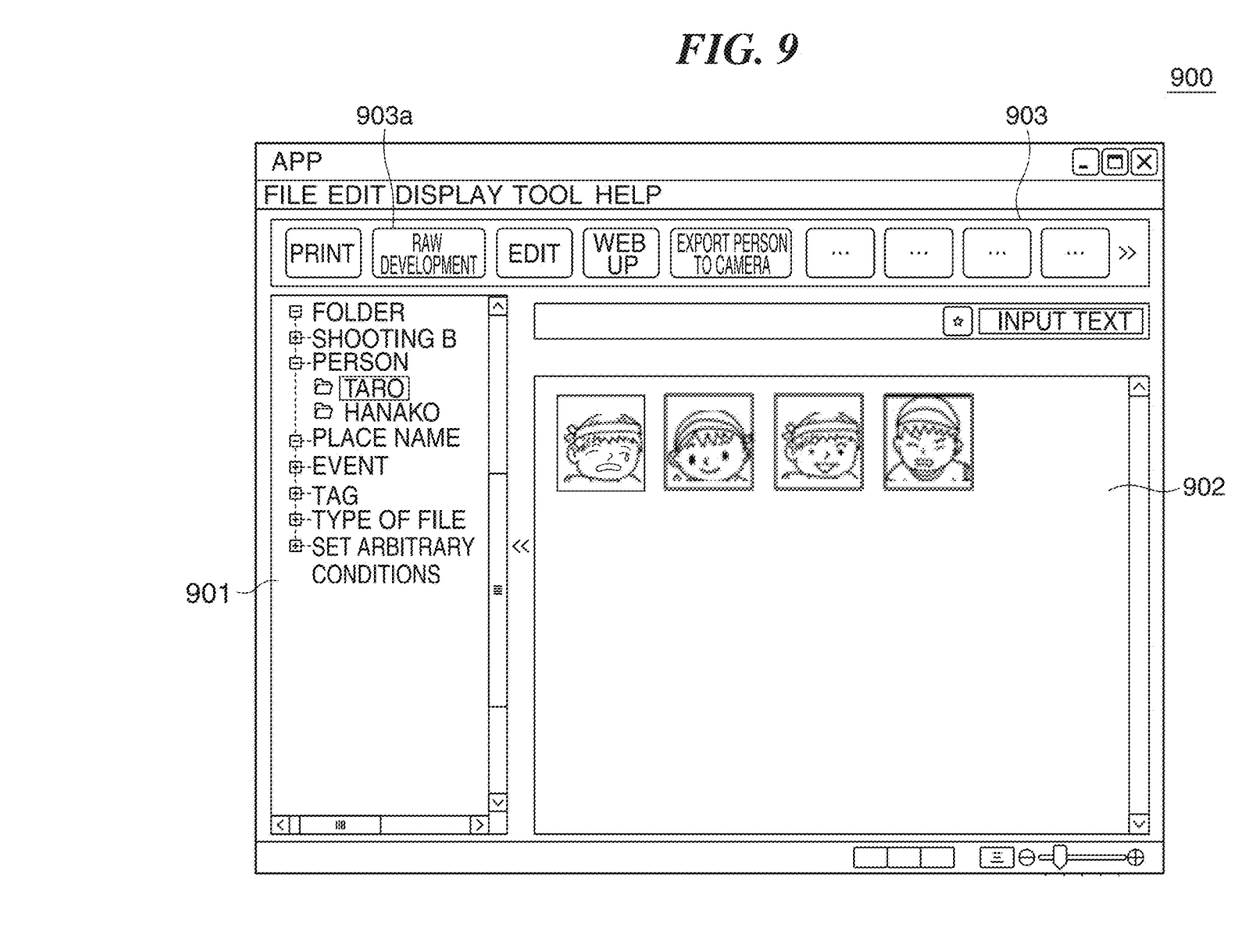
FIG. 9 is a view useful in explaining an exemplary screen of a remote user's terminal which is connected to the image processing apparatus according to the second embodiment of the present invention via the server.

FIG. 9 is a view useful in explaining an application screen 900 which is an exemplary screen displayed on the smartphone 808 of the remote user who receives image data. The application screen 900 is displayed on a display unit of the smartphone 808 of the remote user when the server 700 in FIG. 7 sends image information generated based on reference data or the like stored in the storage device 708 to the smartphone 808 of the remote user.

Referring to FIG. 9, the application screen 900 has a tree view 901, a browser window 902, and an action button display section 903. In a "person" folder in the tree view 901, two folders with folder names "TARO" and "HANAKO" are stored. Reference data on a person named "TARO" is stored in the "TARO" folder, and reference data on a person named "HANAKO" is stored in the "HANAKO" folder.

For example, when the "TARO" folder is selected, the browser window 902 displays reference data stored in the "TARO" folder. The reference data corresponds to the reference data 300a described above and is used to identify a main subject from among a plurality of identified subjects.

The action button display section 903 displays a plurality of buttons for use in inputting instructions to carry out predetermined processes on images displayed in the browser window 902. For example, when a RAW development button 903a is depressed with the "TARO" folder selected, the server 700 carries out the refocusing process to focus on a subject based on the reference data on "TARO".

Figure 10:
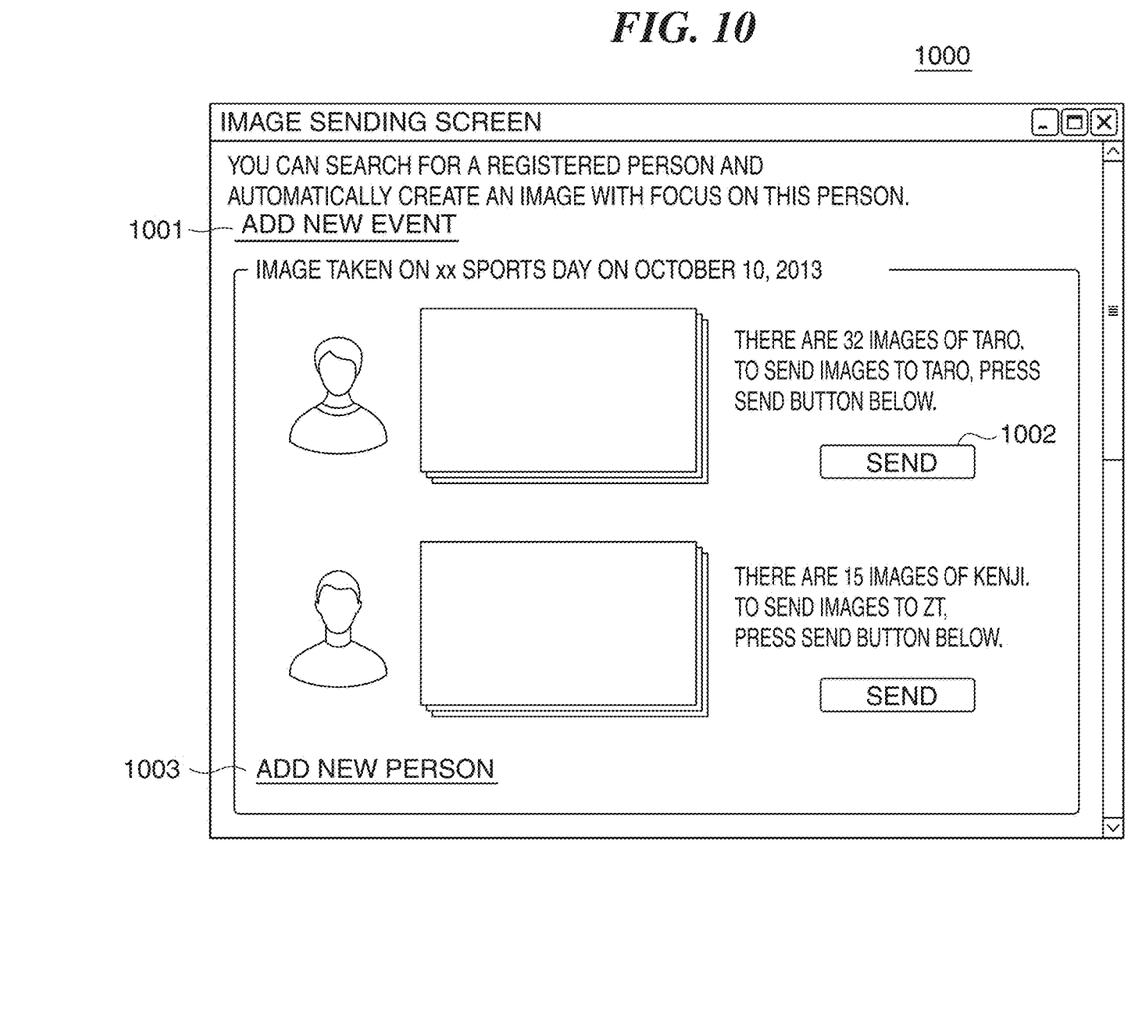
FIG. 10 is a view useful in explaining an exemplary screen of a source user's terminal which is connected to the image processing apparatus according to the second embodiment of the present invention via the server.

FIG. 10 is a view useful in explaining an image sending screen 1000 which is an exemplary screen displayed on a terminal of the source user who sends image data. The image sending screen 1000 is displayed on a display unit of the source user's terminal when the server 700 sends image information for use in accepting an instruction to send image data with each subject refocused on to a terminal of a third party. The image sending screen 1000 is displayed on a display unit of the terminal of the source user such as a PC or a smartphone, and for example, used when the user of the image pickup apparatus 801 issues an instruction to send image data to the remote user.

Referring to FIG. 10, the image sending screen 1000 has a link 1001, a send button 1002, and a link 1003. The source user of the image pickup apparatus 801 selects the link 1001 and uploads image data to the server 700 for each of events such as a sports day and an excursion. When uploading image data to the server 700, the source user specifies an address of the remote user who receives the image data and depresses the send button 1002.

In response to this, the server 700 carries out the refocusing process in FIG. 6 on the uploaded image data and sends image data, in which a subject identified based on reference data corresponding to the remote user who is the destination is refocused on, or a link thereto to the smartphone 808 of the remote user. It should be noted that the address of the remote user is associated with the reference data and stored and managed in the storage device 708. The source user is allowed to select addresses of a plurality of remote users, and when the link 1003 is selected, a screen (not shown) for registering information on a new remote user is displayed on the terminal of the source user.

As described above, specifying on the application screen in FIG. 9 in advance a subject to be focused on in the refocusing process saves the remote user the trouble of choosing a subject to be focused on for each piece of image data or when carrying out a developing process on RAW data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 100, 111 Image processing apparatus
110, 708 Storage device
300, 300a, 300b Reference data
503, 504 Proxy image
504, 505, 805, 806 Subject

The invention claimed is:

1. An image processing apparatus comprising:
a processor; and
a memory storing a program which, when executed by the processor, causes the image processings apparatus to:
obtain a plurality of pieces of unprocessed data on which developing process has not been carried out;
carry out a developing process on one of the pieces of unprocessed data to obtain a piece of processed data;
carry out a subject recognition process on the piece of processed data;
automatically identify a main subject from among a plurality of recognized subjects included in the piece of processed data by comparing each of the recognized subjects to a predetermined subject image; and
based on a phase difference between the plurality of pieces of unprocessed data, synthesize results of the developing process on the plurality of pieces of unprocessed data so that the identified main subject can be brought into focus.

2. The image processing apparatus according to claim 1, wherein the program, when executed by the processor, further causes the image processing apparatus to calculate an amount of defocus in an area of the main subject, and
wherein the results of the developing process on the plurality of pieces of unprocessed data are synthesized so that the amount of defocus can be equal to or smaller than a predetermined value.

3. The image processing apparatus according to claim 1, wherein the plurality of pieces of unprocessed data is generated based on a first signal and a second signal, respectively, output from respective two types of light detectors that detect same incident light.

4. The image processing apparatus according to claim 1, wherein the program, when executed by the processor, further causes the image processing apparatus to receive the plurality of pieces of unprocessed data in which the main subject has never been identified, from an external apparatus via a network.

5. The image processing apparatus according to claim 1, wherein the program, when executed by the processor, further causes the image processing apparatus to send the generated image to an external apparatus via a network.

6. The image processing apparatus according to claim 5, wherein said identifying unit identifies a main subject from among the plurality of recognized subjects included in the piece of processed data by comparing each of the recognized subjects to a predetermined subject image corresponding to the external apparatus.

7. The image processing apparatus according to claim 1, wherein the program, when executed by the processor, further causes the image processing apparatus to generate the processed data by carrying out a compression process and a developing process on a piece of unprocessed data among the plurality of pieces of unprocessed data.

8. A control method for an image processing apparatus, comprising:
   a step of obtaining a plurality of pieces of unprocessed data on which developing process has not been carried out;
   a step of carrying out a developing process on one of the pieces of unprocessed data to obtain a piece of processed data;
   a step of carrying out a subject recognition process on the piece of processed data;
   a step of automatically identifying a main subject from among a plurality of recognized subjects included in the piece of processed data by comparing each of the recognized subjects to a predetermined subject image; and
   a step of, based on a phase difference between the plurality of pieces of unprocessed data, synthesizing results of the developing process on the plurality of pieces of unprocessed data so that the identified main subject can be brought into focus.

9. A non-transitory computer-readable storage medium storing a program for causing a computer to execute a control method for an image processing apparatus, the control method comprising:
   a step of obtaining a plurality of pieces of unprocessed data on which developing process has not been carried out;
   a step of carrying out a developing process on one of the pieces of unprocessed data to obtain a piece of processed data;
   a step of carrying out a subject recognition process on the piece of processed data;
   a step of automatically identifying a main subject from among a plurality of recognized subjects included in the piece of processed data by comparing each of the recognized subjects to a predetermined subject image; and
   a step of, based on a phase difference between the plurality of pieces of unprocessed data, synthesizing results of the developing process on the plurality of pieces of unprocessed data so that the identified main subject can be brought into focus.

* * * * *